A. C. STOESSIGER,

Assignor to H. RENDTORFF.

Stove Board.

No. 9,625. Reissued March 29, 1881.

Witnesses:
F. B. Townsend
F. W. Kasehagen.

Inventor:
Augustus C. Stoessiger
per Lotz & Dyer
Attorneys

UNITED STATES PATENT OFFICE.

AUGUSTUS C. STOESSIGER, OF CHICAGO, ILLINOIS, ASSIGNOR TO HERMANN RENDTORFF, OF SAME PLACE.

STOVE-BOARD.

SPECIFICATION forming part of Reissued Letters Patent No. 9,625, dated March 29, 1881.

Original No. 209,085, dated October 15, 1878; Reissue No. 9,316, dated July 20, 1880. Application for reissue filed August 24, 1880.

*To all whom it may concern:*

Be it known that I, AUGUSTUS C. STOESSIGER, of Chicago, in the county of Cook and State of Illinois, have invented a certain new and useful Improvement in Stove-Boards; and I do hereby declare that the following is a full, clear, and exact description of the construction and operation of the same, reference being had to the annexed drawings, making a part of this specification, and to the letters and figures of reference marked thereon.

Figure 1:
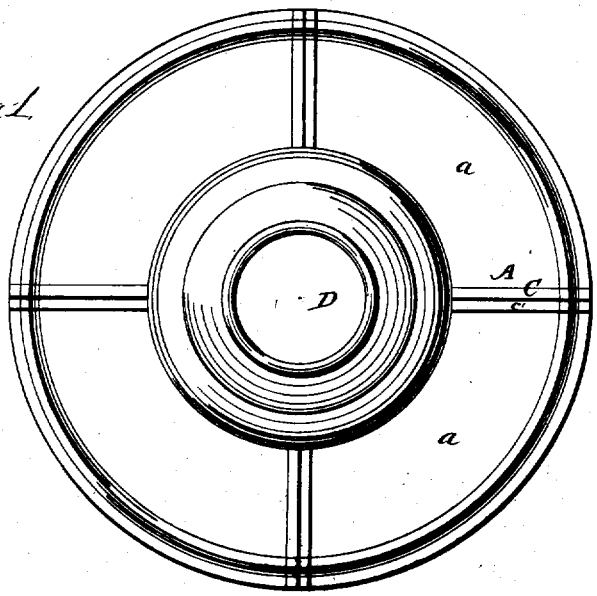
Figure 2:
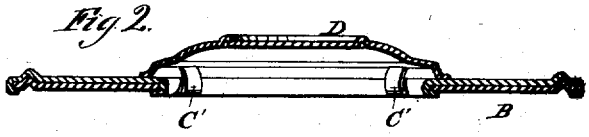
Figure 3:
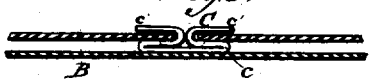

Figure 1 of the drawings is a representation of a plan of my stove-board. Fig. 2 is a vertical central sectional view of the same, and Fig. 3 is a sectional detail view.

My invention relates to a platform or support adapted to be placed under stoves; and the novelty consists in the construction and arrangement of the parts, as will be fully hereinafter set forth, and pointed out by the claims.

The platform proper is made in annular sections with radial joints, and it is provided with an open center and studs to receive a dome, which dome is, when in position, directly under the stove. The upper surface of the platform is of crystallized tin, and it is suitably ornamented. This ornamented tin surface is secured to a wood or sheet-iron base, and non-conducting material may be placed between, if desired. When the base is of wood the tin is made to embrace the periphery and clasp a portion of the under outer edge, and is corrugated. A clasp for the radial joints of the annular sections is formed of one strip of metal, each edge bent lengthwise inwardly upon itself to form the lower plate, and then outwardly to form the upper surface. This clasp secures the sections together, and the inner end of each is turned up to form a lug, against which the dome abuts.

Referring to the drawings, A represents the upper surface of the platform, made of crystallized tin, ornamented to suit, in sections *a*, with radial joints; and B, the base, of wood or metal, to which it is secured.

C represents the clasp, so formed as to present a bottom plate, *c*, and an upper duplex plate, *c'*. This clasp is radially arranged, and it secures the sections together. The inner ends are turned up at C', to form lugs or stops for the dome D, which may be of a separate piece, removable to allow dust, &c., to be cleaned from under it, or it may be secured to the platform. I ornament the upper side, and over such ornamentation I paint, with shellac, Japan, or other varnish, and then bake it. This protects the ornamentation and gives a good finish. The ornamented and varnished crystallized surface of the tin makes the stove-board very attractive in appearance. The sheet-tin will retain the varnish, so that it will not crack off, and such varnish, in addition to giving a bright finish to the stove-board top, also protects the upper crystallized surface of such top, preventing it from oxidizing and allowing the board to be handled and washed without injuring the beauty and finish of the surface. The varnished crystallized surface also has superior reflecting powers, and for that reason the heat thrown down by the stove will be diffused upwardly by the stove-board, and the board will thus be a good non-conductor, and will also act as an agent in utilizing the radiated heat.

The stove-board, with its top made in sections, can be produced more cheaply than if made in one piece, and in crystallizing the small sheets can be more readily manipulated, and can be given a more perfect and uniform finish.

Since it is impracticable to spin the crystallized tin over the edge of the base, it is corrugated and bent over, so as to entirely inclose such edge.

The clasps form slip-joints with the edges of the metal sections, to allow for the expansion and contraction of the parts. These clasps also form a cheap method of joining the sections, and they hug close to the surface of the crystallized tin, so that a stove can be moved thereon without catching the legs on the joints.

What I claim as new, and desire to secure by Letters Patent, is—

1. As a new article of manufacture, the stove-board having an ornamented and varnished crystallized tin top, substantially as and for the purpose set forth.

2. As a new article of manufacture, the stove-board having an ornamented and varnished crystallized tin top, made in sections, substantially as and for the purpose set forth.

3. As a new article of manufacture, the round stove-board composed of a base and an ornamented and varnished crystallized tin top, corrugated at its edge and inclosing the periphery of the base, substantially as and for the purpose set forth.

4. As a new article of manufacture, a stove-board composed of a base and a top made in sections, connected by slip-joints, substantially as and for the purpose set forth.

5. In a stove-board, the combination of base B with top A, made in sections *a*, and the clasps C, forming slip-joints between the sections, substantially as described and shown.

6. The ornamental stove-support described, consisting of the platform A, made in sections *a*, with radial joints, secured to the base B, clasp C, of one piece of metal, bent as described, to form the plates *c c'*, and lugs C', and the dome D, constructed, adapted, arranged, and operating as set forth, for the purpose specified.

In testimony that I claim the above I have hereunto subscribed my name in the presence of two witnesses.

AUGUSTUS C. STOESSIGER.

Witnesses:
A. H. BAUMANN,
F. W. KASEHAGEN.